United States Patent [19]

Ogasawara et al.

[11] Patent Number: 4,523,547
[45] Date of Patent: Jun. 18, 1985

[54] DEVICE SUPPLYING CONSTANT AMOUNT OF FEED

[75] Inventors: Shingo Ogasawara, Kitakyushu; Hideo Nakajima, Nagano, both of Japan

[73] Assignee: Kabushiki Kaisha Nakajima Seisakujo, Nagano, Japan

[21] Appl. No.: 552,136

[22] PCT Filed: Jan. 25, 1983

[86] PCT No.: PCT/JP83/00021
§ 371 Date: Sep. 22, 1983
§ 102(e) Date: Sep. 22, 1983

[87] PCT Pub. No.: WO83/02541
PCT Pub. Date: Aug. 4, 1983

[30] Foreign Application Priority Data

Jan. 25, 1982 [JP] Japan .................................. 57-9798

[51] Int. Cl.³ .......................... A01K 5/00; A01K 39/01
[52] U.S. Cl. ..................................... 119/52 B; 119/53
[58] Field of Search .............. 119/52 B, 52 AF, 52 R, 119/53, 18, 56 R

[56] References Cited

U.S. PATENT DOCUMENTS 3,273,539 9/1966 Cooper ............................... 119/52 B
4,031,857 6/1977 Jones ................................... 119/56 R

FOREIGN PATENT DOCUMENTS 1052157 3/1959 Fed. Rep. of Germany .... 119/52 B
2382853 11/1978 France ............................. 119/52 B
16-14643 8/1941 Japan .
44-31644 12/1969 Japan .
50-75985 2/1975 Japan .
707548 1/1980 Japan .
2037559 7/1980 United Kingdom ............. 119/52 B Primary Examiner—Robert P. Swiatek
Assistant Examiner—Kris R. Schulze
Attorney, Agent, or Firm—Birch, Stewart, Kolasch & Birch

[57] ABSTRACT

A constant feed supplying device having a desired number of flow paths for supplying a feed to a desired number of cages. A discharge port is operatively connected to a feed hopper for transferring the feed introduced into the flow path towards a discharge port and continuously dropping the feed through the discharge port. The discharge port includes a rotary disk mounted for rotation in a sliding contact with the bottom of the flow path. The rotary disk includes a number of through holes provided at suitable intervals so that the through holes may be sequentially brought into position over the discharge port during rotation of the disk. Each flow path is provided with a rotary shaft positioned horizontally within the flow path and projecting out of the flow path so as to be operable by a suitable rotary mechanism. The rotary shaft within the flow path is provided with a control plate so that an operation of the rotary shaft may adjust the gap between the lower edge of the control plate and the upper surface of the rotary disk.

9 Claims, 5 Drawing Figures 4,523,547

DEVICE SUPPLYING CONSTANT AMOUNT OF FEED

FIELD OF TECHNOLOGY

The present invention relates to a device for supplying a constant feed for domestic fowls, pigs, etc., in more detail to a constant-feed supplying device which is capable of supplying a constant feed irrespective of the amount of charge in a feed-supplying hopper.

BACKGROUND TECHNOLOGY

In supplying a feed from a feed hopper to a feeder conduit, it is desirable that a prescribed feed rate should be maintained. A simple, conventional device for constant feed is based on feed control effected by adjusting the sectional area of a path through which the feed is sent from the feed hopper. However, such a device has a disadvantage in that the feed rate depends on the amount of the feed charge in the feed hopper. Another kind of device has been developed in which a cylinder with a rugged surface, capable of rotation, is placed horizontally within a vertical feed path from a hopper, a control plate is placed along the cylinder, and in which the feed is controlled by adjusting the interval between the cylinder and the control plate, thereby adjusting the width of the feed path, and is also controlled by forcing the feed to flow by means of the rotational force on the cylinder. This kind of device, though better than the other above-mentioned device, is still incapable of providing any satisfactory degree of constant feed; especially when plural control plates have been set within the vertical feed path for intended supply of feed to plural feeder conduits, a control of one of the control plates to narrow the corresponding path will cause more feed to flow in the direction toward the other control plates, and thus there is a mutual interaction among feed paths which prevents constant feed from being kept.

OUTLINE OF THE INVENTION

The object of the present invention is to offer a constant-feed supplying device capable of precise control, which is free of the disadvantages mentioned above. The present invention is characterized in that a desired number of flow paths are provided independently which lead a feed, introduced from a supply port connecting to the outlet opening of a feed hopper, to a discharge port practically horizontally and on an arc trace, each of the flow paths is provided with a control plate for adjusting the flow space, and that a driving mechanism is provided within the flow paths which transfers the introduced feed toward the discharge port.

The present invention may arrange a desired constant feed since a feed introduced from a feed hopper is forced to transfer horizontally and during this transfer the deposited feed layer is made uniform and adjusted in its thickness which determines the flow rate.

THE BEST STRUCTURE FOR THE EMBODIMENT OF THE INVENTION

Figure 1:
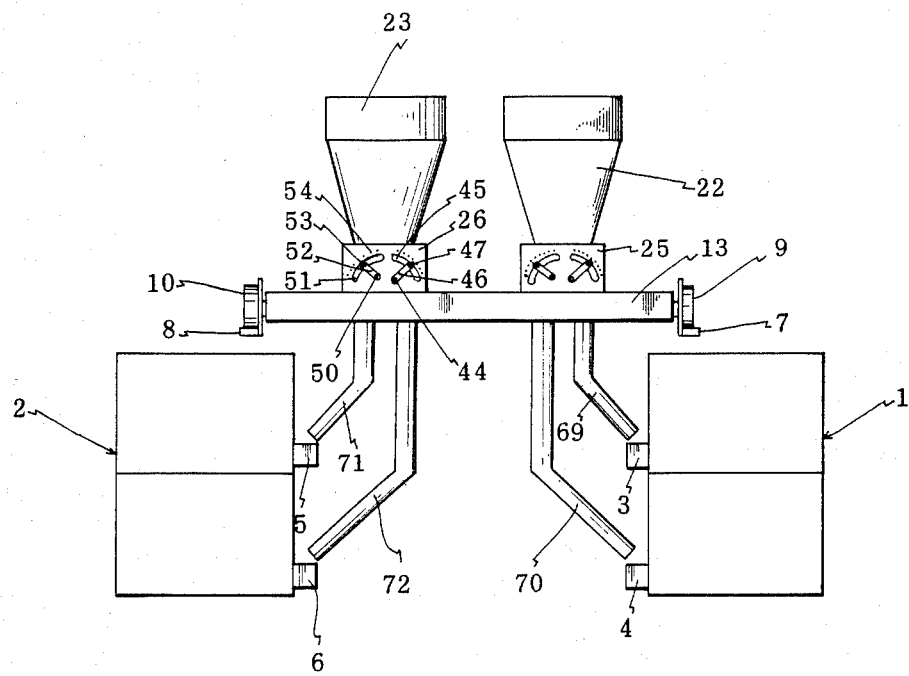
FIG. 1 shows a side-view indicating the positional relation to the feeder conduit.
Figure 2:
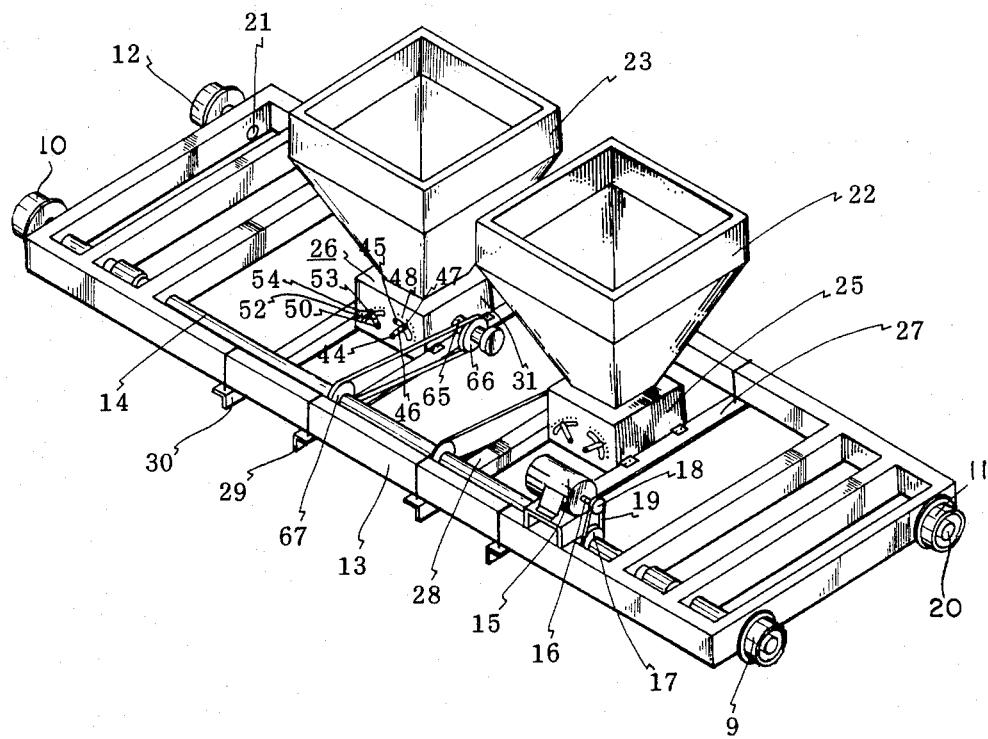
FIG. 2 shows a perspective drawing illustrating the attachment to the fixing frame.

As shown in FIG. 1, two-story cages 1 and 2 are provided with feeder conduits 3 and 4, and 5 and 6, respectively, along the upper and lower lines of the stories. Over the cages 1 and 2 is set parallel a pair of support rails 7 and 8. These support rails 7 and 8 support a fixing frame 13 capable of traveling via wheels 9, 10, 11, and 12. As shown in FIG. 2, the wheels 9 and 10 are fixed on a rotary shaft 14 supported on the fixing frame 13. These wheels 9 and 10 are allowed to serve as driving wheels when the set of a pair of pulleys 17 and 18 and a pulley belt 19 are arranged and are connected to the wheel shaft 14 with the output shaft 16 of a reversible motor 15 set on the fixing frame 13. On the other hand, the wheels 11 and 12 are supported capable of rotation as free wheels on the fixing frame 13 via wheel shafts 20 and 21, respectively. A feed-supplying hopper 23 (and 22) is provided in its lower section with an outlet opening 24 in the form of a square tube (see FIG. 3, where the outlet opening for the hopper 22 is omitted), which can be opened and closed by an ordinary mechanism. To this outlet opening 24 is connected a constant-feed supplying device 26 (and 25). These constant-feed supplying devices 25 and 26 are fixed on the fixing frame 13 via fixing crosspieces 27 and 28, and 29 and 30, respectively.

Figure 3:
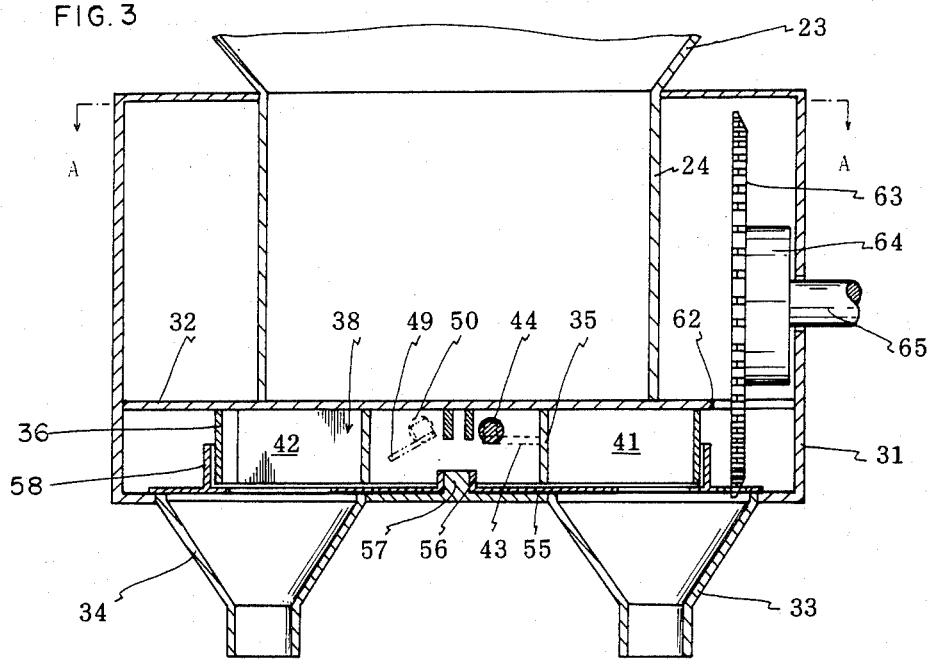
FIG. 3 shows a view of the central vertical section indicating the inside of the casing.
Figure 4:
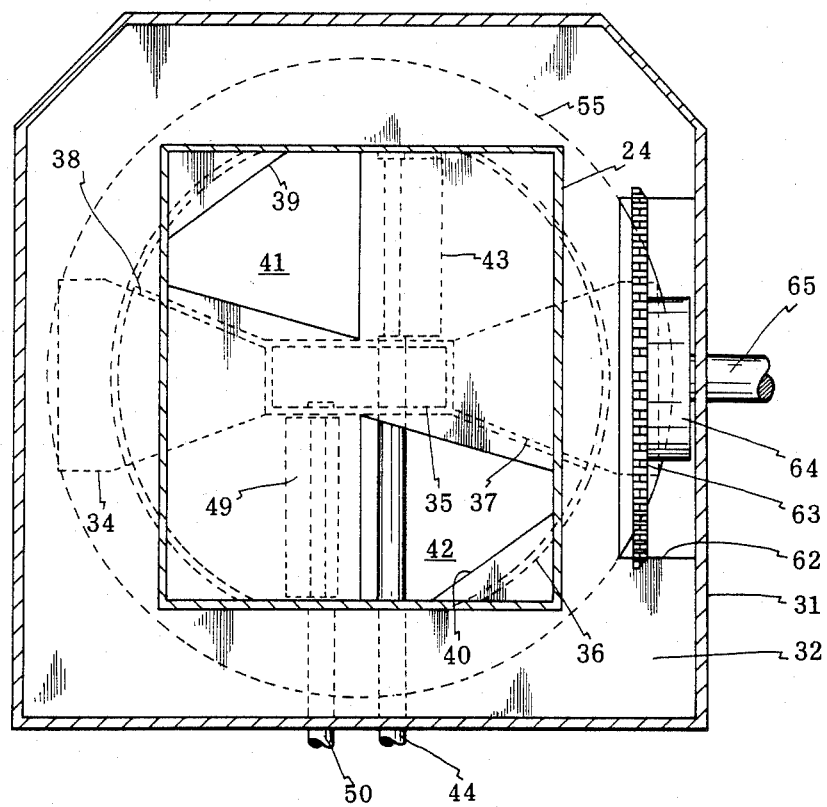
FIG. 4 shows a view of the section specified by the A—A line in FIG. 3.
Figure 5:
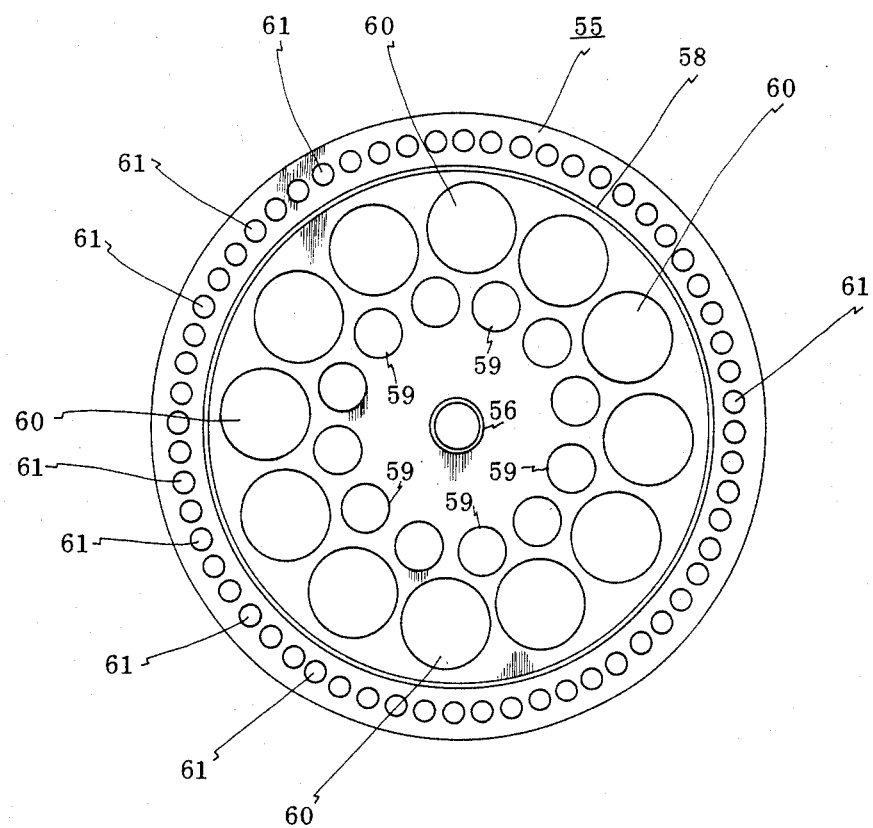
FIG. 5 shows a plan for the rotary disk.

The constant-feed supplying device 26 will be described below on the basis of FIGS. 3, 4, and 5. Description of the constant-feed supplying device 25, having the same structure as the device 26, will be omitted. A casing 31 is provided with a horizontal partition 32 in contact with the lower edge of the outlet opening 24 of the feed hopper 23, and on its lower plane with the first discharge port 33 and the second discharge port 34 both in the form of a funnel. The horizontal partition 32 is provided with a rectangular, inner partition wall 35 so that both the inner edges of the discharge ports 33 and 34 are positioned closely outside the partition wall 35. The horizontal partition 32 is also provided with an outer partition wall 36 in a form of approximate circle, whose diameter is about two thirds the distance between the outer edges of the discharge ports 33 and 34. Vertical partitions 37 and 38 are provided with the horizontal partition 32, which are positioned on each of a pair of opposite edges of the discharge ports 33 and 34 so as to allow a pair of corners on the inner partition wall 35 to communicate with the outer partition wall 36. The first supply port 39 is opened, on the horizontal partition 32 near the vertical partition 38, on the side opposite to the second discharge port 34 so as to communicate with the outlet opening 24; the second supply port 40 is opened, on the horizontal partition 32 near the vertical partition 37, on the side opposite to the first discharge port 33 so as to communicate with the outlet opening 24. Thus, in the lower section of the casing 31 there is formed the first flow path extending horizontally and in an arc from the first supply port 39 to the first discharge port, which is a space enclosed by the horizontal partition 32, the vertical partitions 37 and 38, the outer partition wall 36, and the inner partition wall 35. Also in the lower section of the casing 31 there is formed the second flow path extending horizontally and in an arc from the second supply port 40 to the second discharge port 34, which is a space enclosed by the horizontal partition 32, the vertical partitions 37 and 38, the outer partition wall 36, and the inner partition wall 35. The first control plate 43 is set near the supply port 39 within the first flow path 41. A rotary shaft 44 is supported on both the outer partition wall 36 and the inner partition wall 35, and extending through both the first flow path 41 and the second flow path 42, projects out of the casing 31 at its one end. The section of the rotary shaft 44 within the first flow path 41 has a square cross-section and has the first control plate 43 fixed. As shown in FIGS. 1 and 2, a guide slot 45 in an arc is provided on the casing 31 and serves to hold the guide pin 47 of the first operating lever 46 fixed at the end of the rotary shaft 44 projecting out of the casing 31. A scale 48 is provided on the casing 31 along the upper edge of the guide slot 45 (see FIG. 2). An operation of the first operating lever 46 from outside the casing 31 will displace the first control plate 43, with resulting adjustment of the space of the first flow path 41. The space control effected by displacing the first control plate 43 ranges from completely closed to completely opened and the degree of this control may be recognized by observing the scale 48 from outside the casing 31. The second control plate 49 is set near the second supply port 40 within the first flow path 42. A rotary shaft 50 is supported on both the outer partition wall 36 and the inner partition wall 35, and extending through the second flow path 42, projects out of the casing 31 at its one end. The section of the rotary shaft 50 within the second flow path 42 has a square cross-section and has the second control plate 49 fixed. As shown in FIGS. 1 and 2, a guide slot 51 in an arc is provided on the casing 31 and serves to hold the guide pin 53 of the second operating lever 52 fixed at the end of the rotary shaft 44 projecting out of the casing 31. A scale 54 is provided on the casing 31 along the upper edge of the guide slot 51 (see FIG. 2). As in the case of the first control plate 43, an operation of the second operating lever 52 from outside the casing 31 will displace the second control plate 49, with resulting adjustment of the space of the second flow path 42. The degree of this space control may be recognized by observing the scale 54 from outside the casing 31. A rotary disk 55 serving as a transfer mechanism is supported by putting a boss 56 on the disk 55 into engagement with a projected shaft 57 located at the center of the bottom of casing 31. The rotary disk 55 is provided with a circular projected edge which is positioned concentrically and slightly outside the outer partition wall 36, and, as shown in FIG. 5, is provided concentrically with three groups of circular through-holes. The through-holes 59 and 60 located inside the circular projected edge 58 are for allowing feeds introduced into the flow paths 41 and 42 to flow into the corresponding discharge ports 33 and 34. The through-holes 59 located inside are formed smaller than the through-holes 60 located outside. The through-holes 61 located outside the circular projected edge 58 are formed in turn smaller than the through-holes 59. The through-holes 61 are in engagement with a driving gear 63 whose lower end section is projected through a cut section 62 provided on the horizontal partition 32. The driving gear 63 is fixed at one end of a gear shaft 65 supported on the casing 31 via a clutch (not shown) within a clutch box 64. The gear shaft 65 is provided outside the casing 31 with a pulley 66 (see FIG. 2). As seen from FIG. 2, a pulley belt 68 is applied between the pulley 66 and a pulley 67 fixed on the wheel shaft 14, and it drives the rotary disk 55 when the reversible motor 15 is put into operation. To allow the rotary disk 55 to rotate only in one direction, the driving gear 63 is connected with a clutch mechanism (not shown), which is designed to drive the gear shaft 65 only while the reversible motor 15 is rotating in a prescribed one direction referred to as the forward rotary direction.

The fixing frame 13 is provided with limit switches (not shown) on its forward and backward sides near the wheels 9 and 11. Thus, a detection of this limit switch at the cage end will automatically control the reversible motor 15 so that the fixing frame 13 may reciprocate its movement. An on-off switch (not shown) for the motor 15 is provided at a suitable position on the fixing frame 13. Supply pipes 69, 70, 71, and 72 in FIG. 1 supply feed, having been introduced from the feed-supplying hoppers 22 and 23 via the discharge ports 33 and 34 (not shown for the hopper 22), into the feeder conduits 3, 4, 5, and 6 for the cages 1 and 2. The upper ends of supply pipes 69, 70, 71, and 72 are held at the lower ends of the discharge ports 33 and 34.

The operation of the example system of the present invention will be explained. The feed-supplying hopper 23 is charged with a prescribed amount of feed. The operating levers 46 and 52 are operated to displace the control plates 43 and 49 so that a desired amount of feed may be supplied to each of the feeder conduits 5 and 6 for the cage 2. In the example system adopted, the first control plate 43 is set full-open and the second control plate 49 half-open. The reversible motor 15 is set to rotate in the forward rotary direction, the wheel shaft 14 is rotated in the prescribed direction, and the wheels 9 and 10 also are rotated in the same direction. Thus, the fixing frame 13 begins to move in the prescribed direction on the support rails 7 and 8 along the cages 1 and 2. At the same time, the gear shaft 65 begins to rotate the driving gear 63 and the rotary disk begins to rotate in the prescribed direction (clockwise in FIG. 4). Therefore, with the outlet opening 24 of the feed-supplying hopper 23 kept open, the feed is introduced from the outlet opening 24 via the supply ports 39 and 40 into the flow paths 41 and 42, and then is caused to transfer horizontally and in an arc toward the control plates 43 and 49. During the passage of the feed through the control plates 43 and 49, the control plates 43 and 49 press the feed so that the uneven deposited layer of feed may be made uniform and the prescribed feed rate may be obtained. Thus, feed deposits of uniform density may be maintained at a prescribed rate out of the discharge ports 33 and 34, and therefore, desired constant feed is supplied into the feeder conduits through the supply pipes 72 and 71, respectively. When the fixing frame 13 has traveled to the ends of the cages 1 and 2 with a finish of feed supply to the feeder conduits 5 and 6, the limit switch (not shown) is operated to effect reversal in the traveling direction. During this travel in the reversed direction, the reversible motor 15 is rotating in the reversed direction without rotating the rotary disk 55. Description will be omitted of the sequence of the feed supply from the feed-supplying hopper 22 to the feeder conduits 3 and 4 for the cage 1, which is the same with that from the feed-supplying hopper 23 described above.

As seen from the above description, the present invention may arrange a desired constant feed since a feed introduced from a feed hopper is forced to transfer horizontally and during this transfer the deposited feed layer is made uniform and adjusted in its thickness which determines the feed rate.

As for the number of feed-flow routes, it is not limited to two, but one or three or more than than three may be adopted.

As for the shape of the through-holes to be provided on the rotary disk, square holes may be adopted.

INDUSTRIAL APPLICABILITY

The device of the present invention is useful as a feed-supplying device for raising poultry, pigs, etc.

We claim:

1. A constant feed supplying device comprising:
   a feed hopper;
   an outlet opening in communication with said feed hopper;
   a substantially horizontal partition mounted adjacent to said outlet opening and forming a closure therefor, said substantially horizontal partition includes a predetermined number of ports therein;
   a rotary disk spaced a predetermined distance from said substantially horizontal partition, said rotary disk includes a plurality of through holes disposed therein;
   at least one control plate positioned adjacent to said rotary disk for maintaining the level of feed on said rotary disk at a predetermined thickness; and
   at least one discharge port in communication with a predetermined number of through holes in said rotary disk for discharging feed.

2. A constant feed supplying device according to claim 1, wherein said substantially horizontal partition includes two ports therein for directing feed to two separate locations.

3. A constant feed supplying device according to claim 1, wherein two control plates are provided for independently maintaining the thickness of feed on said rotary disk.

4. A constant feed supplying device according to claim 3, wherein two discharge ports are provided for discharging distinct quantities of feed as independently regulated by said control plates.

5. A constant feed supplying device according to claim 1, and further including an outer partition wall and an inner partition wall affixed to said substantially horizontal partition and defining first and second flow paths.

6. A constant feed supplying device according to claim 5, and further including a circular projecting edge affixed to said rotary disk and being juxtaposed adjacent to said outer partition affixed to said substantially horizontal plate.

7. A constant feed supplying device according to claim 1, and further including a drive gear operatively engaging said rotary disk for imparting rotation thereto.

8. A constant feed supplying device according to claim 1, and further including a fixing frame for supporting said feed hopper for linear movement along a predetermined path.

9. A constant feed supplying device according to claim 1, wherein said rotary disk includes a series of larger and smaller through holes for dispensing feed therethrough.

* * * * *